United States Patent

[11] 3,592,404

| [72] | Inventor | Hubert Nerwin<br>Rochester, N.Y. |
|---|---|---|
| [21] | Appl. No. | 700,055 |
| [22] | Filed | Jan. 24, 1968 |
| [45] | Patented | July 13, 1971 |
| [73] | Assignee | Eastman Kodak Company<br>Rochester, N.Y. |

[54] METHOD AND APPARATUS FOR IMPROVING THE FLATNESS OF ROLL FILM IN A CAMERA EXPOSURE APERTURE
8 Claims, 6 Drawing Figs.

[52] U.S. Cl..................................................... 242/71.2, 352/72, 95/31 R, 206/52 F
[51] Int. Cl...................................................... G11b 23/10
[50] Field of Search............................................ 95/31, 44; 242/71, 71.1, 71.2; 352/72, 78; 226/196

[56] References Cited
UNITED STATES PATENTS

| 1,921,559 | 8/1933 | Case............................ | 95/31 |
|---|---|---|---|
| 1,921,560 | 8/1933 | Case............................ | 95/31 |
| 2,381,033 | 8/1945 | Bolsey......................... | 95/31 |
| 3,159,357 | 12/1964 | Berlings....................... | 242/71.1 |
| 3,404,613 | 10/1968 | MacGregor et al........... | 95/31 |
| 2,238,371 | 4/1941 | Pollack........................ | 95/44 |
| 2,673,500 | 3/1954 | Cassidy....................... | 242/71.2 (X) |
| 3,437,028 | 4/1969 | Berlings....................... | 95/31 (X) |
| 3,476,027 | 11/1969 | Southern..................... | 242/71.2 (X) |

*Primary Examiner*—Samuel S. Matthews
*Assistant Examiner*—Russell E. Adams, Jr.
*Attorneys*—Robert W. Hampton and Ronald S. Kareken ABSTRACT: The film guide path from the roll to the aperture is in the form of a smooth spiral of continuously increasing radius. This improves film flatness by eliminating all abrupt curvature transitions from the film guide path whereby the next exposure frame to be advanced into the camera exposure aperture does not acquire any localized distortive curvature.

PATENTED JUL 13 1971 3,592,404
FIG. 1
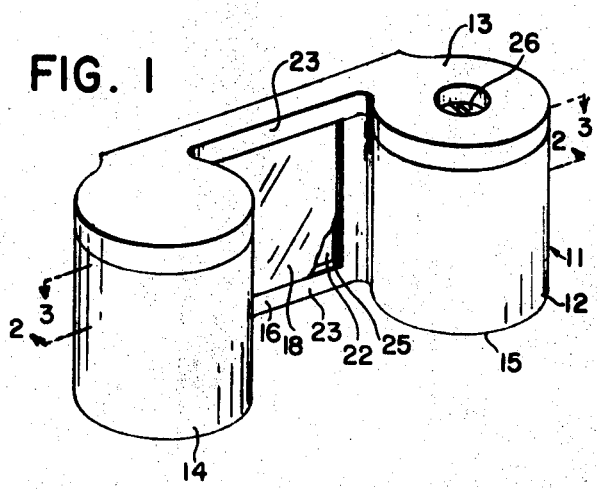
FIG. 2
FIG. 4
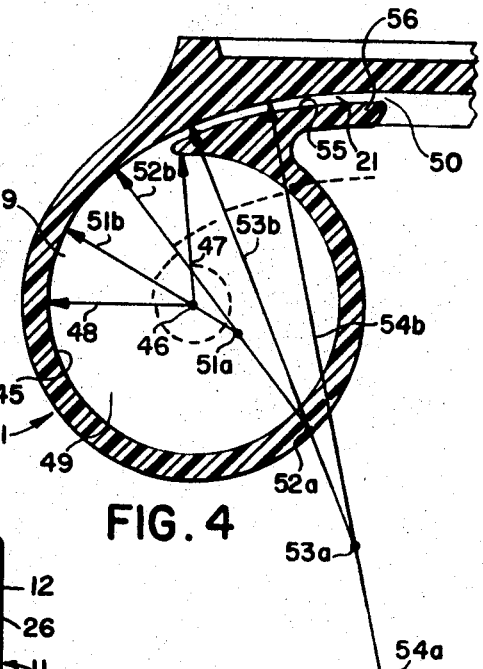
FIG. 3
FIG. 5
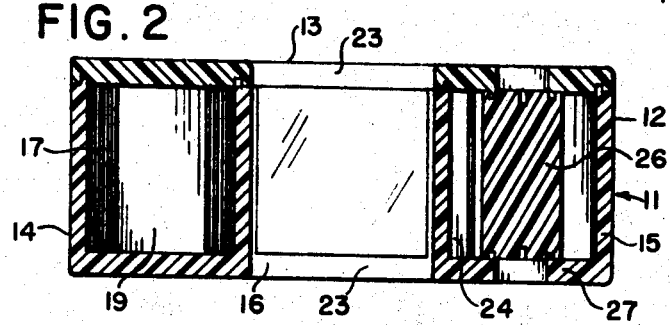
FIG. 6
(PRIOR ART)
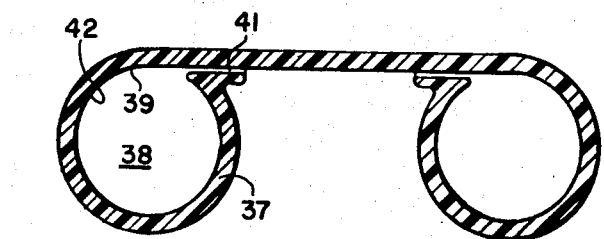
HUBERT NERWIN
INVENTOR.
BY Ronald S Kaehn
Robert W Hampton
ATTORNEYS 3,592,404

METHOD AND APPARATUS FOR IMPROVING THE FLATNESS OF ROLL FILM IN A CAMERA EXPOSURE APERTURE

BACKGROUND OF THE INVENTION

1. Field of the Invention

The present invention relates to improving the flatness of strip material which is supplied in roll form but used in a flat plane. More particularly, this invention relates to improving the quality of photographic records, such as prints and transparencies, produced using cameras of the type in which a series of exposures are made along an elongate filmstrip as the filmstrip is unwound from a film supply roll in a film supply chamber and advanced through an exposure aperture in an exposure gate adapted to support successive exposure frames of the strip at the focal plane of the camera lens system. Still more specifically, the invention is directed to increasing the flatness of an exposure frame supported by the exposure gate by minimizing localized distortive curvature imparted to the film by the internal conformation of the film supply chamber and the film path from the chamber to the exposure aperture.

2. Description of the Prior Art

In cameras of the type described above, the film supply roll is rotatably housed within a film supply chamber defined either by the camera housing or, alternatively, by the film supply compartment of a removable film cartridge which may also comprise all or part of the exposure gate structure and/or a film takeup compartment. Regardless of these structural variations, however, the significant common feature of such previously known constructions is that a portion of the filmstrip in the supply chamber is supported along a path including one or more relatively abrupt curvature transitions, particularly at the point of tangency between a curved portion of the film path and a straight segment of the path coplanar with the exposure plane and leading into the exposure gate. Accordingly, if the loaded camera is not used for a prolonged, but reasonably expectable period of time, the next frame of the film along such an abrupt transition region of the path tends to assume the same relatively abrupt curvature, thereby acquiring a line-set or localized bent area extending transversely of the filmstrip. When the film is next advanced, this localized bent area will be moved into the exposure aperture where it produces a deterioration in film flatness at this critical position.

SUMMARY OF THE INVENTION

To substantially eliminate this undesirable phenomenon, the present invention provides guide means adapted to guide strip material such as roll film away from a supply roll and into alignment with a flat work station such as an exposure aperture along a smooth spiral path of continuously increasing radius.

BRIEF DESCRIPTION OF THE DRAWING

The present invention will be more fully understood by reference to the following detailed description when read in conjunction with the attached drawing, wherein like reference numerals indicate like elements, and wherein:

FIG. 1 is a perspective front view of a double-compartment film cartridge embodying the present invention;

FIG. 2 is a cross-sectional front elevational view of the cartridge in Figure 1, taken along the line 2-2 of Figure 1;

FIG. 3 is a cross-sectional view of the cartridge of Figure 1 taken along the line 3-3 of Figure 1, showing the cartridge installed in a similarly depicted camera for illustrating the cooperation between the camera and the cartridge;

FIG. 4 is an enlarged view of a portion of Figure 3, showing the film supply compartment of the cartridge with the filmstrip removed therefrom for purposes of clarity;

FIG. 5 is a cross-sectional top elevational view of the body casing of a film cartridge corresponding generally to the one shown in Figures 1—4 but embodying a variation in the curvature of the film guide means which determines the path of the film in the cartridge; and FIG. 6 illustrates a prior art cartridge.

DESCRIPTION OF THE PREFERRED EMBODIMENT

The film cartridge 11 illustrated in Figures 1—4 is of the double-compartment type comprising a body casing member 12 and a cover member 13 which cooperate to provide a film supply compartment 14 connected to a film takeup compartment 15 by an intermediate wall member 16. Before the cover member is installed on and sealed to the body member, a coreless roll of film 17, comprising one end of an elongate filmstrip 18, is placed in the film supply chamber 19 within the film supply compartment; with the leading end of the filmstrip extending out of the supply chamber through film passageway 21, into an exposure aperture 22, along the flat surface of wall member 16 between longitudinal guide lips 23, and into a takeup chamber 24 through a similar film passageway 25. Within the takeup chamber, the end of the filmstrip is attached to winding core 26 rotatably supported at its opposite ends between lower wall 27 of the takeup compartment and the corresponding upper wall of the compartment provided by cover member 13. Thus, in the assembled cartridge, the usable portion of the filmstrip is located initially within the supply chamber, from which it can be advanced progressively to the exposure aperture 22 and into the takeup chamber by rotation of winding core 26. The exposure aperture 22 is defined by the lips 23, the exit of passageway 21 and the entrance to passageway 25, and is the exposure area for one exposure frame of the film 17. The passageway 21 terminates at the edge of the exposure aperture 22 and is tangent to the plane of the exposure aperture at this line.

Figure 3 shows the assembled cartridge loaded into a camera 28 comprising an external housing 29 provided with a hinged cover door 31 and with an open-ended internal support member 32 of tapered rectangular configuration adapted to support the camera lens system represented by lens 33. As disclosed and claimed in commonly assigned copending U.S. Pat. application Ser. No. 700,056, entitled Film Cartridge and Camera, filed in my name on Jan. 24, 1968, the internal support member 32 is provided with coplanar rearwardly facing film engaging surfaces 34, coincident with the flat focal plane of the lens system and adapted to be engaged by marginal areas of the portion of the filmstrip in the exposure aperture 22 of the cartridge when the latter is loaded into the camera and urged forwardly by spring-loaded pressure pad 35 on cover door 31. Thus, the film-engaging surfaces of the support member and the flat wall surface of the magazine cooperate to provide the film gate which supports the exposure area 36 of the filmstrip with its forwardly facing emulsion surface in flat condition at the focal plane of the lens system. With the cartridge so installed in the camera, winding core 26 is engaged by a conventional film-advancing mechanism, not shown, adapted to rotate the core to wind the film progressively through the exposure gate and into the takeup chamber.

Since the flexible but gradually deformable filmstrip is initially coiled within the film supply chamber, the filmstrip is inherently curved when it is advanced into the film gate. If this inherent curvature of the film is relatively uniform and gradual, the exposure area of the filmstrip nevertheless can be supported in acceptably flat condition by sandwiching the adjacent marginal film areas between the gate surfaces under a moderate force which is insufficient to prevent free advancement of the film through the gate. However, as previously mentioned, if the filmstrip has acquired a line-set or a localized transverse area of relatively abrupt curvature, it may be impossible to flatten this region of the film between the gate surfaces without increasing the gate pressure to an extend that will interfere with free movement of the film through the gate.

Furthermore, even if the locally distorted marginal areas of the film can be flattened in the gate, corresponding film distortion may persist nevertheless in the central exposure area.

To illustrate more specifically the manner in which the above-described line-set or localized distortion of the film is apt to arise in previously known film cartridges, Figure 6 shows a cartridge having a film supply compartment 37 generally similar to the one illustrated in Figures 1—4 but in which the configuration of the guide path is different and corresponds to that of known cartridges. In this construction, the film supply chamber 38 includes a generally cylindrical film roll cavity which is tangentially continuous with a straight film guide passageway 41 aligned with an appropriate exposure aperture. Figure 6 does not illustrate a filmstrip within the cartridge, but it will be understood that the film supply roll is located within chamber 38 with the leading end of the filmstrip extending through the passageway 41. Due to the inherent tendency of the wound strip to expand outwardly, a phenomenon commonly referred to as "clockspringing," the strip tends to conform to the configuration of the curvilinear inner wall surface 42 which defines the roll cavity. Accordingly, over an extended period of time, the next frame of film to be advanced into the exposure aperture is located partially along the passageway 41 and partially along the curved wall surface 42 thus acquiring a localized distortive curvature in the transverse area 39. This localized distortive curvature in the next frame of the film prevents the film from lying flat in the exposure plane in the exposure aperture. This appears to be due to the frame having acquired a curve-set in one portion of the frame and none in the other.

The improved internal conformation of the film supply compartment of the cartridge depicted in Figures 1—4 is best illustrated in Figure 4. In this construction, the continuous curvilinear inner wall surface 45 of the film supply chamber 19 is substantially concentric with axis 46 along an arc extending in a clockwise direction from radius arrow 47 to radius arrow 48. This portion of the wall surface defines roll cavity 49 which is adapted to receive and to preserve the generally cylindrical shape of the film roll as the latter clocksprings outwardly within the roll cavity. Beyond the roll cavity, however, the portion of the curvilinear outer wall surface between radius arrow 48 and the edge 50 of the exposure aperture 22 in which the film is to be used is formed as a spiral of increasing radius which preferably begins at a point on the chamber wall about 90 outward from the exposure plane of the exposure aperture and reaches infinite radius at the edge 50. The spiral passageway 21 preferably has a continuously changing curvature. The passageway may, however, be formed of a plurality of curved finite increments of equal radius, placed so as to provide a smooth passageway of increasing radius. Curvature (K) is mathematically defined as the rate of change of direction of a curve and is the reciprocal of the radius of curvature (R). The curve of the passageway 21 has a curvature at the line at which it is tangent to the outer convolution of the roll of film in the supply chamber which is equal to the curvature of said outer convolution (or to the curvature of the inner surface 45 of the chamber 19, since the supply roll normally clocksprings to said surface). The curvature of the passageway 21 at its other end where it is tangent to the plane of the exposure aperture 22 at the line edge 50 is zero. The curvature of the passageway 21 between its two ends can be continuously changing or can be smoothly changing in finite increments.

The passageway 21 preferably has a length equal to the length of one exposure frame of the filmstrip (or more accurately equal to the pitch of the frames, that is, the distance from a given point on one frame to the corresponding point on an adjacent frame). Such a construction, however, would result in a longer passageway (and hence larger cartridge or other guide structure) than would otherwise be necessary. For this reason it may be that a particular camera-cartridge format cannot accommodate such a construction. In such case it has been found that even where the length of the passageway must be less than that of an exposure frame, the photographic image quality has been much improved by improving film flatness by using the curved guide path of the present invention. Where it is desired to keep the cartridge small, and therefore to keep the passageway 21 short, film flatness can be improved by using the curved guide path of the present invention and by making the path as long as possible, that is, from a line on the supply chamber wall to the line edge of the exposure aperture and by having the passageway tangent at one each of its ends to one each of said lines. The path preferably should have a curvature which smoothly and gradually decreases from the curvature of the outer convolution of the supply roll to zero at the edge of the exposure aperture. A constant curvature is also useful where a continuously decreasing curvature cannot be used. Flatness is also improved by making the passageway length equal to that of an exposure frame and by giving it a constant curvature (including zero, although this could require a relatively long cartridge).

Figure 4, for example, shows how the radius of curvature of the passageway 21 varies, the points 46, 51a, 52a, 53a and 54a and the respective arrows 48 and 51b to 54b illustrating various radii of curvature. It will be seen that this guide wall conformation provides a continuous gradual curvature transition between the film roll and the exposure gate, for the next frame to be advanced, thereby substantially eliminating any abrupt change in curvature in said next frame.

Opposite the outermost portion of wall surface 45, a similarly curved surface 55 along lip member 56 is spaced therefrom by a uniform distance slightly greater than the thickness of the filmstrip. Both the curvature of the passageway 21 and the fact that the filmstrip substantially fills up the passageway 21 result in preventing the passage of light into the film supply chamber. A separate light lock is not necessary. If desired, the opposed wall surfaces along both of the film passageways can be provided with transverse sawtooth serrations, as is well known in the prior art, to further reduce the possibility of light entering the supply chamber by grazing reflection between the adjacent film and wall surfaces.

In addition to improving the flatness of the film in the gate area, the reduction in abrupt curvature of the filmstrip afforded by the present invention also reduces the frictional drag imposed thereon by the film guide surfaces, for which reason the same guide wall conformation may also be employed in the film takeup chamber as illustrated in Figure 3.

While the above-described curvilinear wall surface 45 is defined by a particular type of curve such as one defined by successive, finite, arcuate increments of increasing radii, alternate guide surfaces performing the same function can be defined by other types of curves, e.g. by a parabolic curve approaching an infinite radius of curvature at its point of tangency with the exposure plane at the edge of the exposure aperture. Correspondingly, references herein to axes or radii of curve increments are not intended necessarily to imply the existence of finite arcuate increments along a path of identical curvature, but merely to provide a convenient means for defining curvature by reference to consecutive arcuate increments of determinable radius which closely approximate the curve under consideration.

Additionally, it should be recognized that a plurality of spaced film-guiding surfaces could be substituted for the illustrated single uninterrupted wall surface to locate the film roll and the adjacent curved portion of the filmstrip as described above.

Figure 5 shows a film cartridge 56, similar to the one previously described, in which the portion of the inner wall surface 58 between (going clockwise) radius arrows 59 and 61 likewise defines a generally semicylindrical roll cavity 62 concentric with axis 63. Between the roll cavity and opening 64 of passageway 65, however, the wall surface curves outwardly from the roll cavity along a single arc tangential with flat exposure gate surface 66 and having its axis 67 located beyond the film supply chamber. In this embodiment, therefore, the radius of curvature of the portion of the filmstrip adjacent the gate, as shown by radius arrows 68 and 69, is approximately three times the maximum radius of the supply roll and could be further increased by altering the illustrated position of axis 67 relative to the supply roll. At the point of transition between the opposite end of the arcuate wall surfaces and the adjacent semicylindrical cavity wall surface, the curvature experienced by the film is necessarily more pronounced than in the preferred construction, but still considerably less abrupt than that encountered in prior art cartridges. Therefore, while the change in curvature is not as gradual as in the preferred embodiment, localized film distortion is nevertheless reduced substantially in comparison to previously known cartridges.

While the preceding description relates to a specific type of double compartment film cartridge, it should be apparent that the invention is equally applicable to other types of double-compartment cartridges including those in which the filmstrip is provided with a layer of protective backing paper and those in which different means are employed to support the film in an exposure gate. Likewise, the invention can readily be embodied in single-compartment magazines, such as magazines for size 135 film. The invention can also be employed advantageously in a camera adapted to be loaded with conventional roll film by incorporating the film guide path of the present invention in the camera. The present invention is also applicable to other types of apparatus using other types of strip material which are supplied in roll form and used in a flat configuration and which must be maintained as flat as possible in a work station.

This invention has been described in detail with particular reference to preferred embodiments thereof, but it will be understood that variations and modifications can be effected within the spirit and scope of the invention as described hereinabove and as defined in the appended claims.

I claim:

1. In a cartridge for roll film, said cartridge comprising a first surface defining a film supply chamber for holding said film in a roll and for defining the curvature of an outer convolution of said roll and a second surface tangent to said first surface defining a film guide path for guiding said film from said chamber to an edge of an exposure gate, the improvement wherein:

said path has a constant curvature less than said curvature of said outer convolution and a length substantially equal to the length of one exposure frame of said roll film.

2. In a film cartridge comprising a film supply compartment including an internal chamber provided with wall means for rotatably supporting and laterally confining a generally cylindrical roll of film comprising the coiled end of an elongate strip of film and with means defining an opening through which the other end of said strip of film extends beyond said compartment, the improvement comprising; film guide means within said cartridge adapted to locate the portion of said strip of film between said roll and said opening along a unidirectionally curved path merging tangentially at one end with said roll of film and spiraling outwardly therefrom, said path having adjacent its opposite end a curvature equivalent to that of a corresponding arc defined by a radius at least three times as long as the maximum radius of said generally cylindrical roll of film.

3. The invention defined by claim 2 in which said path of said portion of said strip of film defines a spiral curve of progressively decreasing curvature between said one end thereof and said other end thereof.

4. The invention defined by claim 2 in which said film guide means comprises a curvilinear internal wall surface within said chamber engageable by said portion of said strip of film to support said portion of said strip of film along said curved path.

5. In a film magazine comprising a film supply compartment including an internal chamber provided with wall means for rotatably supporting and laterally confining a generally cylindrical roll of film comprising the coiled end of an elongate strip of film and with means defining an opening through which the other end of said strip of film extends beyond said compartment, the improvement comprising: film guide means for improving the flatness of film leaving the supply compartment, said guide means being disposed within said housing and shaped to locate the portion of said strip of film between said wall means and said opening along a unidirectionally curved path merging tangentially at one end with said wall means and spiraling outwardly therefrom along a curve definable by a plurality of consecutive arcuate increments of progressively greater radii.

6. In a cartridge for roll film including means defining a film supply chamber for holding film in a roll having an outer convolution, means for supporting said film in flat condition in an exposure plane and means defining a film guide path for guiding film from the outer convolution of said roll to said means for supporting said film in a flat condition, the improvement wherein, said defining means defines a path which is tangent at one end to said outer convolution, which is tangent at the other end to the exposure plane and which is in the shape of a smooth curve of progressively decreasing curvature from said outer convolution to said exposure plane, said defining means increasing the flatness of film leaving said supply chamber.

7. A film magazine comprising:

a film supply compartment for housing a roll of filmstrip, a film takeup compartment for receiving said filmstrip from said supply compartment, an intermediate wall member including means for supporting said filmstrip in an exposure plane between said supply compartment and said takeup compartment, and film guide means between said supply compartment and said support means for locating a portion of said filmstrip along a curved path from said roll to said support means, said curved path being in the shape of a spiral curving from said roll to said support means without increase in curvature.

8. In a film magazine comprising:

a film supply compartment including an interior chamber adapted to rotatably house a roll of film comprising one end of an elongate filmstrip, a film takeup compartment spaced from said film supply compartment and adapted to receive the opposite end of said filmstrip, and an intermediate wall member including a flat surface engageable by a segment of said filmstrip between said roll and said opposite end of said strip received by said takeup compartment to define a straight intermediate film path along said flat surface, the improvement comprising;

film guide means defined by said film supply compartment and engageable by at least part of the portion of said filmstrip between said roll and said straight intermediate film path to locate said portion of said filmstrip along a unidirectionally curved film supply path tangential at its respective opposite ends with said roll and said straight intermediate film path and having adjacent said straight intermediate film path a curvature substantially equivalent to that of a corresponding arc defined by an axis located beyond said supply compartment, said axis of said arc equivalent to said curvature being located along an imaginary line extending between said compartments in perpendicular relation to said flat surface from the region of tangential transition between said curved supply path and said straight intermediate film path.